J. T. WILDER.
Turbine Water-Wheel.
No. 213,080. Patented Mar. 11, 1879.
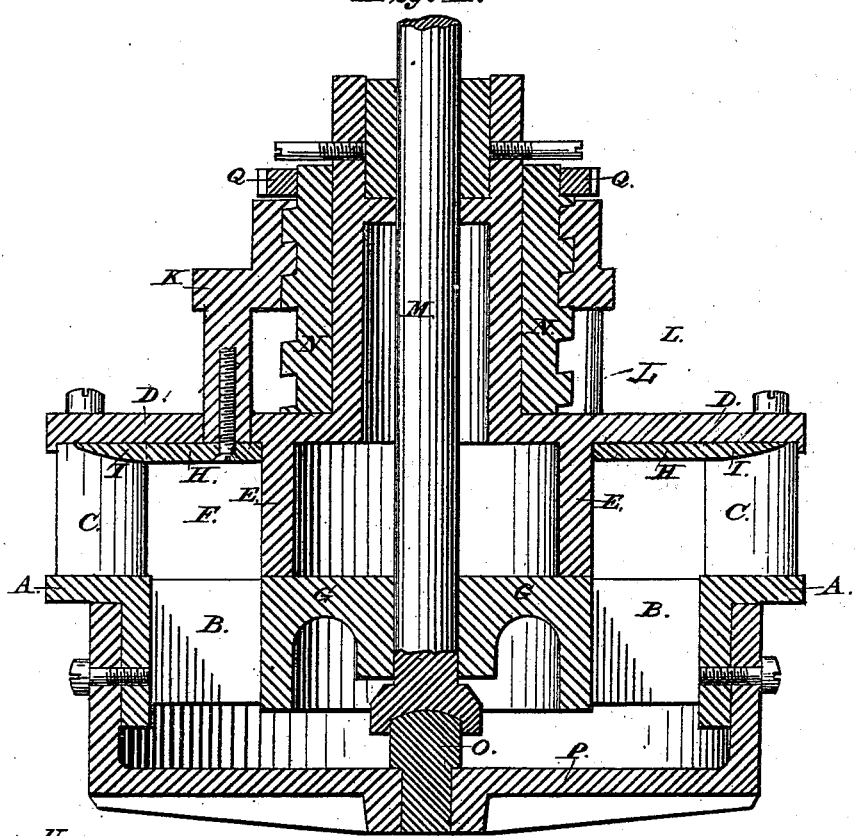
Fig. 1.
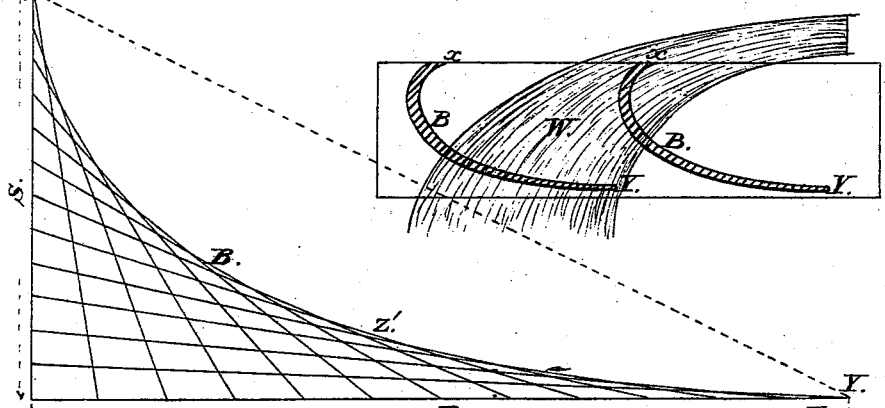
Fig. 4.
Fig. 5.
Witnesses:
Alex. Scott
Henry Wahly
Inventor:
John T. Wilder,
By DeWitt C. Allen,
Attorney.

J. T. WILDER.
Turbine Water-Wheel.

No. 213,080. Patented Mar. 11, 1879.

Witnesses:
Alex Scott
Henry Wahly

Inventor:
John T. Wilder,
DeWitt C. Allen,
Attorney.

UNITED STATES PATENT OFFICE.

JOHN T. WILDER, OF CHATTANOOGA, TENNESSEE.

IMPROVEMENT IN TURBINE WATER-WHEELS.

Specification forming part of Letters Patent No. 213,080, dated March 11, 1879; application filed January 20, 1879.

*To all whom it may concern:*

Be it known that I, JOHN T. WILDER, of Chattanooga, county of Hamilton, and State of Tennessee, have invented certain new and useful Improvements in Turbine Water-Wheels; and I do hereby declare the following to be a full, clear, and exact description of the same, reference being made to the accompanying drawings, forming a part of this specification, and in which—

Figure 2:
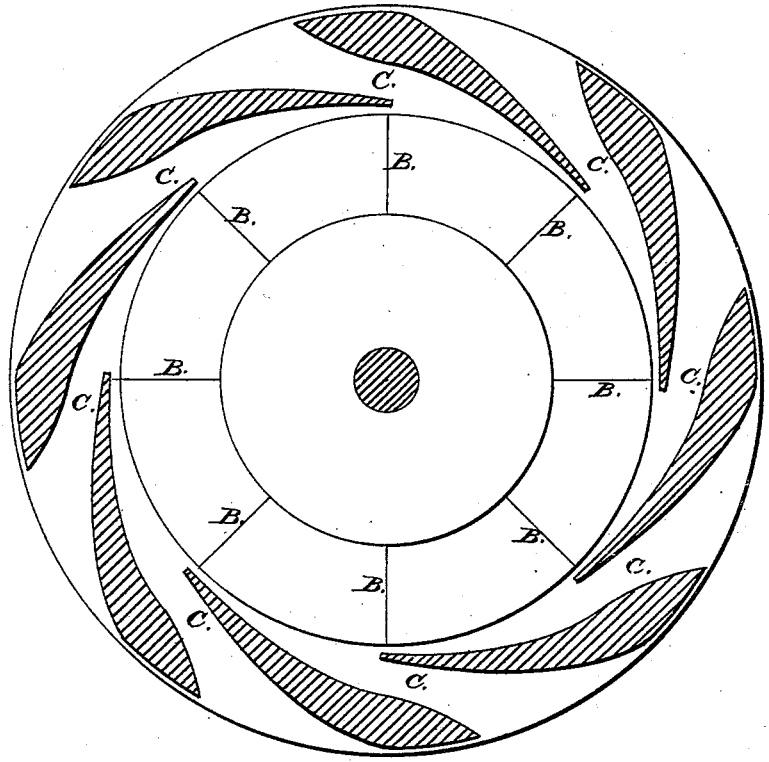
Figure 3:
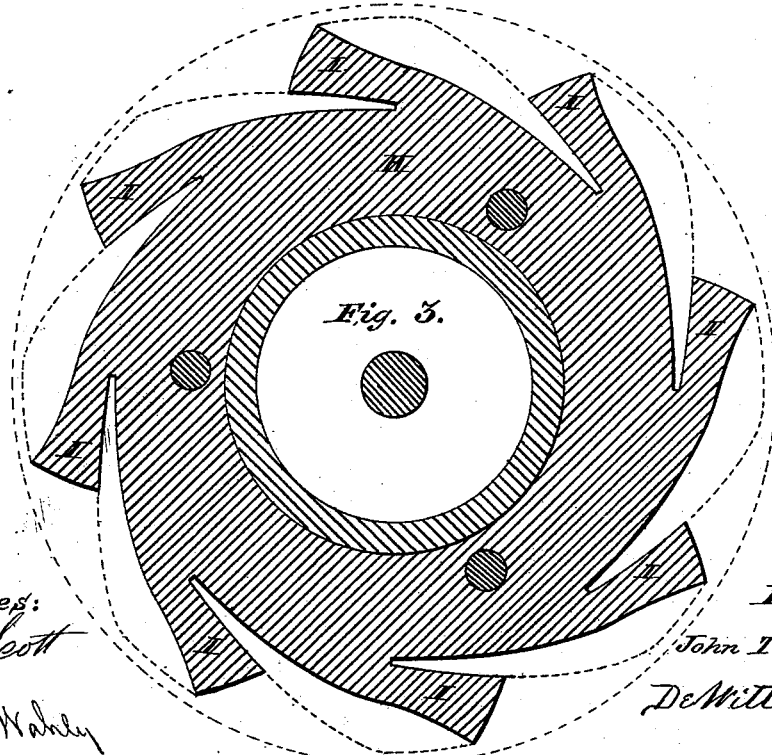

Figure 1 represents a vertical section of my improved wheel; Fig. 2, a top or plan view of the same with the case removed; Fig. 3, a detached view of the annular plate or gate.

This invention relates to improvements in devices for regulating the space through which the water passes to the buckets to correspond with the area or column of water passing through the guide curves or chutes, whereby the velocity is maintained from the point of inlet to the guide curves or chutes until it begins to act upon the buckets of the wheel, so as to allow the full percentage or useful effect of the water to be obtained, either when a partial or full gate is used.

Heretofore vertical ring-gates with horizontal flanges projecting between the guide curves or chutes have been used for regulating the flow of water to the buckets; but this construction is obviously objectionable, for the reason that the vertical ring-gate could not regulate the space over the buckets when different quantities of water were admitted thereto, in consequence of which the space above the buckets would have to be filled before the water would pass to the buckets, thus acting upon the buckets at a reduced velocity and loss of momentum in consequence of the water passing several times around in said space before it is sufficiently filled to force it into the buckets, causing a loss by friction and interfering eddies. Furthermore, in this class of turbine wheels the side chutes or guide-curves have been so arranged as to deliver the water partially to the side of the buckets, and they have also been arranged to deliver on top, through guide curves or chutes sometimes adjustable by an annular plate with slots, through which the water flows.

All the above-described arrangements are objectionable when a partial gate is used, for the reason that those which take the water upon the sides deliver the column of water at portions of the buckets situated at different angles with the line of action, while the velocity of the water at every part through the guide curves or chutes is kept constant. Those which receive the water on top of the buckets have either imperfect means of adjustment for regulating the flow of different quantities of water, or else have it cut up by passing to the buckets through slots through an annular plate, which causes an intermittent or throbbing action of the water upon the buckets, resulting in a deficient effect in proportion to the quantity of water used when a partial gate is drawn.

This invention is intended to obviate the above-described effects; and to this end the invention consists in the combination, with a turbine wheel provided with side guide curves or chutes, of a non-revolving horizontal annular plate or gate vertically adjustable inside the guide curves or chutes, and directly over the buckets, for the purpose of proportioning the annular space over the buckets to the amount of water used, so as to keep the velocity due from the pressure of the head constant, whether a partial or full gate is used.

It further consist in the combination, with a turbine wheel provided with side guide curves or chutes, of a non-revolving vertically-adjustable annular plate or gate provided with projecting flanges fitted to slide between the guide curves or chutes, so as to correct cross-currents of the water from the fore-bay as it passes through said guide curves or chutes to the buckets of the wheels.

It further consists in a novel arrangement of devices for adjusting the annular plate.

It finally consists in a novel form of bucket, all as will be hereinafter fully described.

In the drawings, A represents the usual outer case of a turbine wheel, inside of which the curved buckets B revolve. C represents the guide curves or chutes through which the water is directed into the annular space F, above the buckets. D represents the usual plate covering the guide curves or chutes and annular space above the wheel, with annular flange-plate E projecting downward and forming the inner wall of the annular space F above the buckets, and making a close joint with the inner rim, G, of the wheel.

H represents the adjustable horizontal annular plate or gate, provided with horizontal projecting flanges I, arranged to fit between the guide curves or chutes C. K represents a yoke surrounding the shaft M of the wheel, and which is connected by rods L L, passing through the plate D to the annular plate or gate H. The yoke K can be vertically adjusted, for adjusting the annular plate or gate, by means of a screw, N. This screw is revolved by means of a spur-wheel, Q, into which a pinion is fitted, and connected by a small shaft to a hand-wheel above. When the screw N is revolved, it hoists or lowers the annular plate or gate H, with the flanges I, admitting the requisite amount of water to the wheel B. The shaft M of the wheel is supported in the step O in the bridge-tree P in the usual manner.

It will be observed that the guide curves or chutes are arranged to deliver the whole column of water into the annular space F above the buckets, so that all the water in passing to the buckets of the wheels is made to sustain its maximum of velocity until it reaches the top of the buckets, where its sustained momentum is effectually delivered and expended upon the buckets of the wheel, the adjustable annular plate or gate keeping the annular space over the buckets proportionate to the amount of water used, whether partially drawn or with a full gate, enabling the wheel to give a maximum percentage of power to the proportion of water used.

Fig. 4 represents the action of the water on the buckets when the wheel is in motion. The water is received on the sharp upper edge, $x$, of the buckets, whose curve is such that the water passes through the wheel in the shape of a parabola, the stream constantly increasing in volume and decreasing in velocity until its force is so nearly spent on the buckets B as to only retain sufficient motion to carry itself away from the buckets. My improved wheels are so proportioned as to increase the volume of the water in passing through the buckets of the wheel to five times the volume of the column of water that impinges on the top of the buckets B, thus expending ninety-six per cent. of its momentum on the buckets.

Fig. 5 represents an enlarged sectional view of one of my improved buckets, R representing the space on the periphery of the wheel between the lower or discharging ends of the buckets.

S represents a distance at right angles with R, and half as great to V. T represents a prolongation of S, and one-third the distance of S. U represents a distance one-half of T, and parallel with R. V is connected with X by an elliptic curve, Z, whose perpendicular axis is one-half that of its horizontal axis. Y is connected with V by an elliptic curve, Z′, whose perpendicular axis is twice that of its horizontal axis.

The result of this form of bucket is shown in the action and form of the water W in Fig. 4 as it passes through the wheel when at work, the water being received at $x$ without shock, and passing through the wheel without eddies in a solid column, following the line of a parabola, constantly increased in volume and decreased in velocity until it has increased in volume four hundred per cent. and decreased in velocity twenty per cent., imparting ninety-six per cent. of its momentum to the buckets, and leaving the wheel free as the discharging water falls into the space below the wheel.

I claim as my invention—

1. The combination, with a turbine wheel provided with side guide curves or chutes, of a non-revolving vertically-adjustable horizontal annular plate or gate, arranged inside of said guide curves or chutes, and directly above the buckets of the wheel, whereby the annular space above the buckets is adapted to be proportioned to the amount of water used, either with a partial or full gate, substantially as herein shown and described.

2. The combination, with a turbine wheel provided with side guide curves or chutes, of a non-revolving vertically-adjustable horizontal plate or gate, arranged inside of the guide curves or chutes, and directly above the buckets of the wheels, and provided with horizontal flanges I, projecting between the guide curves or chutes, substantially as and for the purpose herein shown and described.

3. In a water-wheel, the combination, with the annular horizontal gate H, of the rods L, screw-yoke K, screw N, and spur-wheel Q, the several parts constructed and relatively arranged to operate substantially as and for the purpose herein shown and described.

4. In a turbine water-wheel, a series of buckets provided with the elliptical curves Z Z′, the curve Z having its perpendicular axis about one-half that of its horizontal axis, and the curve Z′ having its perpendicular axis about twice that of its horizontal axis, substantially as and for the purpose herein shown and described.

JOHN T. WILDER.

Witnesses:
W. M. BRADFORD,
J. H. RAGSDALE.